(12) United States Patent
Tschirpke

(10) Patent No.: US 8,446,737 B1
(45) Date of Patent: May 21, 2013

(54) IN-WALL MOUNTED HOUSING FOR ELECTRONIC COMPONENTS

(76) Inventor: David Tschirpke, N. Grosvenordale, CT (US)

( * ) Notice: Subject to any disclaimer, the term of this patent is extended or adjusted under 35 U.S.C. 154(b) by 151 days.

(21) Appl. No.: 12/884,484

(22) Filed: Sep. 17, 2010

Related U.S. Application Data

(60) Provisional application No. 61/292,039, filed on Jan. 4, 2010.

(51) Int. Cl.
*H05K 7/14* (2006.01)
*H05K 7/18* (2006.01)

(52) U.S. Cl.
USPC ............................ 361/796; 361/730; 361/752

(58) Field of Classification Search
USPC ......... 361/752, 796, 800, 714, 724, 728–730, 361/797; 174/66–67, 100, 50–51; 312/223.1–223.2
See application file for complete search history.

(56) References Cited

U.S. PATENT DOCUMENTS

| | | | |
|---|---|---|---|
| 2,730,261 A * | 1/1956 | Tutt | 220/3.7 |
| 3,896,960 A * | 7/1975 | Schindler et al. | 220/3.5 |
| 3,917,101 A * | 11/1975 | Ware | 220/3.2 |
| 3,980,197 A * | 9/1976 | Ware | 220/3.6 |
| 5,596,174 A * | 1/1997 | Sapienza | 174/57 |
| 6,642,447 B1 * | 11/2003 | Mailloux | 174/50 |
| 7,087,836 B2 * | 8/2006 | Archer et al. | 174/50 |
| 7,525,043 B1 * | 4/2009 | Gretz | 174/50 |
| 8,193,444 B2 * | 6/2012 | Rodenberg | 174/50 |

* cited by examiner

*Primary Examiner* — Hung S Bui
(74) *Attorney, Agent, or Firm* — Mirick, O'Connell, DeMallie + Lougee, LLP

(57) ABSTRACT

An in-wall mounted housing or enclosure for an electronic apparatus, such as used as part of a wireless sound system, is configured with a relatively large volume chamber which requires a limited size cut-out for installation. With such a configuration, the enclosure can be mounted within a wall, ceiling, or floor structure while having a sufficient volume to contain all of the required electrical components for a particular application, such as in a wireless sound system. In one arrangement, the housing is configured with two or more chambers where each chamber contains a distinct electrical component. Separation of certain electrical components into distinct chambers can minimize electrical interference between the components during operation. In one arrangement, the housing is further configured to carry both low voltage and high voltage components within the separate chambers while minimizing electrical interference among the components.

19 Claims, 16 Drawing Sheets

IN-WALL MOUNTED HOUSING FOR ELECTRONIC COMPONENTS

CROSS REFERENCE TO RELATED APPLICATIONS

This Patent Application claims priority to related U.S. Provisional Patent Application No. 61/292,039 filed on Jan. 4, 2010, entitled, "AN IN-WALL SINGLE-TO-MULTIPLE VOLTAGE APPARATUS", the contents and teachings of which are hereby incorporated by reference in their entirety.

BACKGROUND

Home sound systems typically include a set of speakers placed throughout a room to provide a listener with a desired audio effect. Certain sound systems are configured as wireless sound systems that minimize the presence of hard wires that connect the speakers to a sound amplifier source in the listener's room.

For example, conventional wireless sound systems include an audio source, such as a combination of a phonograph, tape player, radio receiver or compact disc player and an audio amplifier, wireless signal transmitter electrically coupled to the sound source, and a set of receiving units, each receiving unit electrically coupled to a corresponding audio speaker. During operation, the transmitter receives audio signals from the audio source, and transmits the audio signals to the receiving units, in either digital or analog format, as wireless audio signals via radio waves, microwaves, or infra-red light. The receiving units receive and convert the wireless audio signals into an appropriate format and supply them to the corresponding acoustic speakers, typically through wired connections.

Conventionally, in wireless sound systems, a common housing contains a receiving unit and corresponding acoustic speaker to form a wireless speaker. With certain wireless speakers, manufacturers provide a mounting apparatus to mount the wireless speaker to or a wall, ceiling, or other convenient support surface. Alternately, certain manufacturers allow the wireless speakers to be mounted within a wall structure.

SUMMARY

Conventional wireless speakers suffer from a variety of deficiencies. For example, conventional wireless speaker housings or wall boxes are sized to allow for installation within a wall cavity. However, certain home sound systems require the wall boxes to carry either a greater number or larger volume of electronic components than the conventional wall boxes can contain. Accordingly, it may not be convenient or even possible to use conventional housings or wall boxes in a home sound system because of the quantity or size of the electronic components used. Additionally, in the case of conventional in-wall mounted wireless speakers having an audio amplifier and wireless receiver device mounted within a common enclosure, due to the size of the amplifier and receiver, interference can be generated between the audio amplifier and wireless receiver (e.g., radio frequency) device as well as among the power supplies and radio frequency devices or audio amplifiers.

Also, it is also not practical or allowed by certain agency standards for conventional in-wall wireless speaker housings to carry both low voltage components and high voltage components within the same compartment or volume space. For example, high voltage solid state or tube-based amplification electronics can generate a relatively large amount of heat due to the design of their individual power supplies. Accordingly, building codes administered by certain agencies do not allow such amplifiers to be carried by in-wall wireless speaker housings.

To avoid compliance and safety issues raised by high-voltage amplification electronics, certain manufacturers have opted to use low voltage digital amplification devices that do not generate as much heat as solid state or tube based amplification. However, in order to adequately amplify an audio signal using the low voltage amplification devices to provide a relatively higher quality sound or volume desired, the devices require a relatively larger power supply that will not fit in a conventional wireless speaker housing. Accordingly, manufacturers have opted to separate the power and amplification components of the wireless speaker electronics. For example, manufacturers typically use low quality external power supplies that are electrically connected to the in-wall amplification electronics in order to provide power to the low voltage amplification devices. However, these power supplies are unsightly, require a relatively large number of parts for installation, and require a relatively long time to install, which can become costly.

By contrast to conventional electrical or electronic components, embodiments of the invention relate to an in-wall mounted housing or enclosure for electronic components or an electronic apparatus, such as used as part of a wireless sound system. The housing is configured with a relatively large volume chamber, larger than is visually indicated by an associated enclosure cover plate, which requires a limited size cut-out for installation. With such a configuration, the enclosure can be mounted within a wall, ceiling, or floor structure while having a sufficient volume to contain all of the required electrical components for a particular application, such as in a wireless sound system. In one arrangement, the housing is configured with two or more chambers where each chamber contains a distinct electrical component. Separation of certain electrical components into distinct chambers can minimize electrical interference between the components during operation. In one arrangement, the housing is further configured to carry both low voltage (e.g., wireless receives, amplifiers) and high voltage (e.g., power supplies) components within the separate chambers while minimizing electrical interference among the components.

In one arrangement, embodiments of the invention relate to a housing for an electronic apparatus. The housing includes a first housing portion having a first front portion, a first rear portion opposing the first front portion, and a first longitudinal axis extending between the first front portion and the first rear portion, the first front portion defining first width. The housing includes a second housing portion having a second front portion and a second rear portion opposing the second front portion, the second front portion and the second rear portion extending from the first housing portion along a second longitudinal axis, the second longitudinal axis being substantially perpendicular to the first longitudinal axis, a distance between the second front portion and the second rear portion defining a second width, the second width being substantially equal to the first width. The first housing portion and the second housing portion define a chamber configured to contain the electronic apparatus.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to an in-wall mounted housing or enclosure for an electronic apparatus, such as used as part of a wireless sound system. The housing is configured with a relatively large volume chamber, larger than is visually indicated by an associated enclosure cover plate, which requires a limited size cut-out for installation. With such a configuration, the enclosure can be mounted within a wall, ceiling, or floor structure while having a sufficient volume to contain all of the required electrical components for a particular application, such as in a wireless sound system. In one arrangement, the housing is configured with two or more chambers where each chamber contains a distinct electrical component. Separation of certain electrical components into distinct chambers can minimize electrical interference between the components during operation. In one arrangement, the housing is further configured to carry both low voltage (e.g., wireless receives, amplifiers) and high voltage (e.g., power supplies) components within the separate chambers while minimizing electrical interference among the components.

Figure 1:
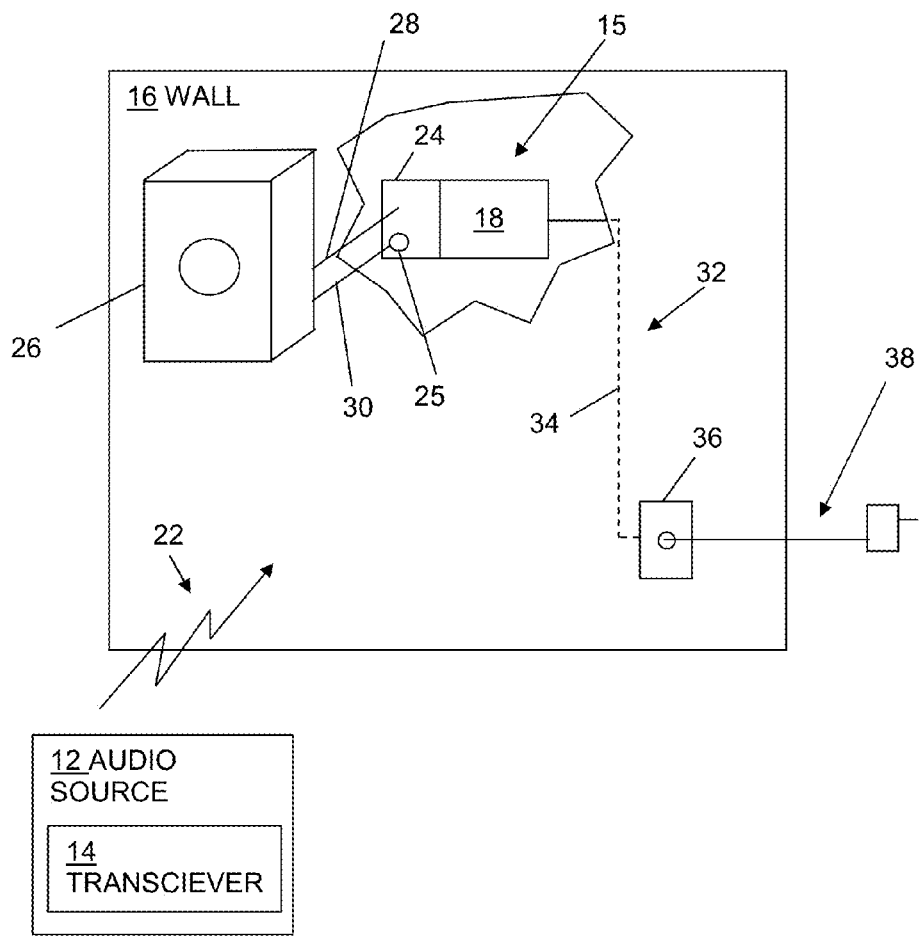
FIG. 1 illustrates a schematic representation of a wireless sound system having an electronic apparatus assembly, according to one embodiment.

FIG. 1 illustrates an example of a wireless sound system 10, according to one embodiment. The wireless sound system 10 includes an audio source 12, such as a combination of a phonograph, tape player, radio receiver or compact disc player and an audio amplifier, a wireless transceiver 14 disposed in electrical communication with the audio source 12, and an electronic apparatus assembly 15 at least partially disposed within a building or support structure, such as a wall 16, ceiling, or floor. In one arrangement, the electronic apparatus assembly 15 contains electronic components and is configured to mount a device, such as a loudspeaker 26, to the wall 16 and to receive wireless signals from the transceiver 14 for delivery to the loudspeaker 26.

For example, as illustrated the electronic apparatus assembly 15 includes, as part of the electronic components, a wireless transceiver 18 configured to exchange wireless audio signals 22 with the wireless transceiver 14. The electronic apparatus assembly 15 also includes, as part of the electronic components, amplification electronics or a signal amplifier circuit 24, such as low voltage amplification electronics, disposed in electrical communication with the wireless transceiver 18. The electronic apparatus assembly 15, in one arrangement, includes a mechanical coupling mechanism 28, such as a bracket, configured to carry an external device, such as the loudspeaker 26. Additionally, the electronic apparatus assembly 15 includes an electrical connector 25 configured to provide electrical coupling between the amplification electronics 24 and the loudspeaker 28 via a coupling mechanism 30, such as a cable.

The electronic apparatus assembly 15 receives power for operation through a power delivery assembly 32. The power delivery assembly 32 includes a power line 34 disposed within the wall 16 between the electronic apparatus assembly 15 and a power jack 36 mounted to the wall 16. The power jack 36 electrically couples to a power source, such as a wall outlet, via a power adaptor 38 such as an externally coupled AC adaptor.

In use, the audio source generates an audio signal 22 that the associated transceiver wirelessly transmits as a radio frequency or infrared signal, for example, to the electronic apparatus assembly 15. The transceiver 18 receives the wireless signal 22 and passes the signal to the amplification electronics 24. The amplification electronics 24, in turn, amplify the signal for delivery to the loudspeaker 26.

As indicated above, the electronic apparatus assembly 15 is installed at least partially within support structure 16, such as a wall, ceiling, or floor. Such installation minimizes the presence of hard wires that connect the loudspeaker 26 to the associated audio source 12 within a listener's room. As will be described in detail below, in one arrangement the electronic apparatus assembly 15 includes an enclosure or housing defining a shape that allows for an effortless installation of the electronic apparatus assembly 15 with a minimal cut-out in the supporting structure 16, yet provides an increased internal volume for components and parts.

With reference to FIGS. 2-5, a housing 50 of the electronic apparatus assembly 15 includes a first housing portion 52 and a second housing portion 54 that define a chamber 56 configured to contain an electronic apparatus, such as a wireless transceiver 18 and amplification electronics 24, as described above. As illustrated, the configuration of the first and second housing portions 52, 54 provide a chamber 56 with a relatively large volume, such as a volume of about 40 cubic inches, to contain all of the required electrical components, either high or low voltage components, for a particular application. For example, with a volume of about 40 cubic inches the housing 50 can contain primarily high voltage wires where an increased volume is desired. The physical size of the chamber 56 is important to the finished appearance of the electronic apparatus assembly 15. For example, the internal volume and function of the housing 50 is configured to accommodate all necessary electrical components while minimizing disruption to the décor or style of the intended structure wall or room during installation.

To allow the relatively large volume housing 50 to be installed within a structure having a minimal opening cut-out, as will be described below, the first and second housing portions 52, 54 are configured with a particular geometry.

For example, the first housing portion 52 includes a first front portion 58, a first rear portion 60 opposing the first front portion 58, and a first longitudinal axis 62 extending between the first front portion 58 and the first rear portion 60. In one arrangement, the first housing portion 52 is sized to fit within a standard wall opening for a conventional single ganged outlet box. For example, the first housing portion 52 defines a width 64 of about 2.5 inches, a height 66 of about 3.75 inches, and a depth 68 between the first front portion 58 and the first rear portion 60 of about 3.0 inches. With such sizing, installation of the electronic apparatus assembly 15 minimizes disruption to the receiving structural member or wall 16.

As illustrated, the first housing portion 52 defines a first curved portion 70 extending between the first front portion 58 and the first rear portion 60. The first curved portion 70 is configured to allow the electronic apparatus assembly 15 to rotate about a pivot location or intersection portion 72 between the second housing portion 54 and the first housing portion 52 relative to an opening in a structural member during installation or removal while minimizing the ability for the first housing portion 52 to catch or snag materials disposed within the structural member. Accordingly, the first curved portion 70 provides the electronic apparatus assembly 15 with a guide for easy insertion into a structural member or wall cavity. While the first curved portion 70 can be configured with a variety of radii, in one arrangement, the first curved portion 52 is configured with a radius of about 2.5 inches.

In one arrangement, the first front portion 58 includes a flange member 75 extending at least partially about an outer perimeter of the first front portion 59. The flange member 75 is configured to abut a structural member, such as a wall, to help support the electronic apparatus assembly 15 once the electronic apparatus assembly 15 has been installed.

The second housing portion 54 includes a second front portion 74 and a second rear portion 76 opposing the second front portion 74. The second front portion 74 and the second rear portion 76 extend from the first housing portion 52 along a second longitudinal axis 78 where the second longitudinal axis 78 is substantially perpendicular to the first longitudinal axis 62 of the first housing portion 52. In one arrangement, the second housing portion 54 is sized to be inserted within a standard wall opening for a conventional single ganged outlet box. For example, the second housing portion 54 defines a width 80 between the second front portion 74 and the second rear portion 76 of about 2.0 inches, a height 82 of about 3.75 inches, and a length 68 of about 3.75 inches. With such spacing between the second front portion 74 and the second rear portion 76, the second housing portion 54 can be inserted within a standard wall opening for a conventional single ganged outlet box to allow installation of the electronic apparatus assembly 15 with minimal disruption to the receiving structural member or wall 16. Additionally, with such orientation and sizing of the second housing portion 54 relative to the first housing portion 52, the electronic apparatus assembly 15 can house a relatively large number or volume of electronic components within a wall chamber.

As illustrated, the second housing portion 54 defines a second curved portion 86 extending between the second front portion 74 and the second rear portion 76 and defines an angled portion extending between the second curved portion and the second rear portion. The second curved portion 86 and the angled portion 88 provide a relatively large internal volume cavity while minimizing snagging or interference of the electronic apparatus assembly 15 with a rear wall of a support structure during installation or removal. While the first curved portion 70 can be configured with a variety of radii, in one arrangement, the first curved portion 52 is configured with a radius of about 1.15 inches. Additionally, while the angled portion 88 can define a variety of angles 89, in one arrangement, the angled portion defines an angle of between about 20° and 50° relative to the second rear portion 76.

Figure 6:
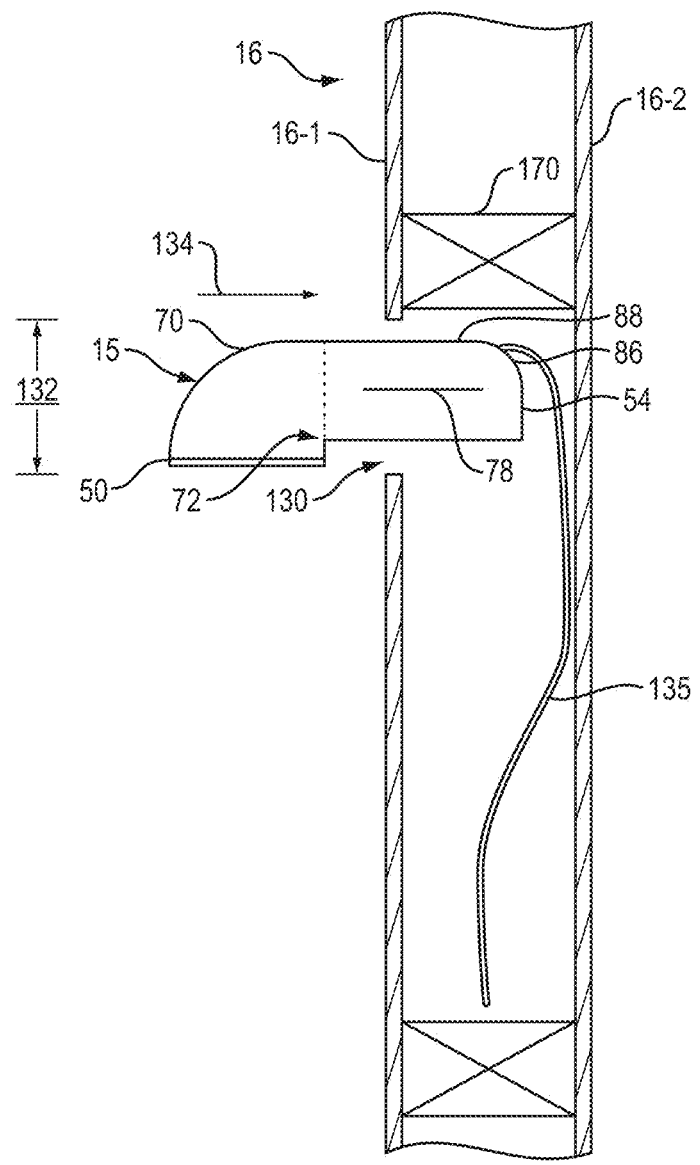
FIG. 6 illustrates installation of the electronic apparatus assembly between two opposing wall elements of a wall.
Figure 7:
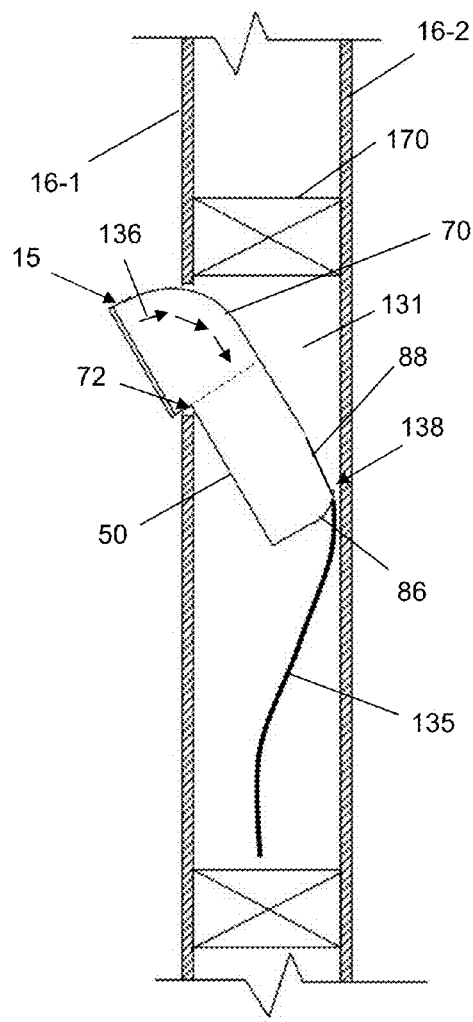
FIG. 7 illustrates further installation of the electronic apparatus assembly between two opposing wall elements of a wall.
Figure 8:
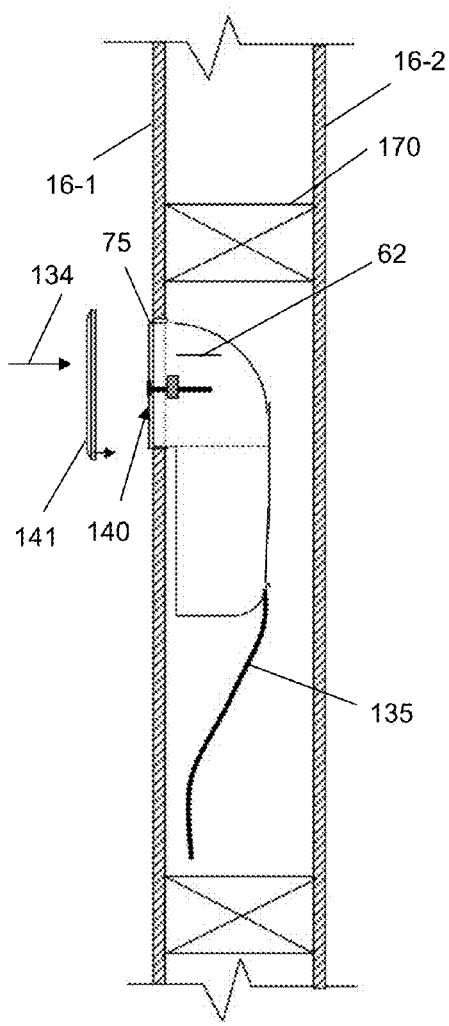
FIG. 8 illustrates securing of the electronic apparatus assembly between two opposing wall elements.

As indicated above, the physical geometry of housing 50 of the electronic apparatus assembly 15 is important with respect to the installation of the electronic apparatus assembly 15 within a structure, such as a wall or wall cavity. FIGS. 6-8 illustrate a method for installing the electronic apparatus assembly 15 within a wall and show the interrelationship between the assembly 15 and support structure.

In one arrangement, an installer forms an opening 130 in a wall 16 of a structure, where the opening 130 defines an opening height (not shown) and an opening width 132. For example, the installer forms the opening 130 in a first wall 16-1 of a wall structure where the opening defines a width 132 of about 3.0 inches and a height of about 4.0 inches (e.g., a standard wall opening for a conventional single ganged outlet box). The installer then inserts the second housing portion 54 into the opening 130 where the second housing portion 54 has a height 82 is smaller than the opening height and a width 80 that is smaller than the opening width 132. With such dimensions of the second housing portion 54, the installer can easily fit the second housing portion 54 within the opening 130. The installer then advances the electronic apparatus assembly 15 into the opening 130 along a longitudinal axis 78 of the second housing portion 54. For example, the installer advances the electronic apparatus assembly 15 into the opening 130 along direction 134 which is substantially perpendicular to a face of the first wall 16-1. Alternately, the electronic apparatus assembly 15 can be installed at any angle deemed necessary for a given application.

After the installer has advanced the electronic apparatus assembly 15, the pivot location or intersection portion 72 between the second housing portion 54 and the first housing portion 52 abuts a portion of the wall 16-1, as indicated in FIG. 7. At this point in the installation procedure, the installer rotates the electronic apparatus assembly 15 within a wall cavity 131 relative to the opening 130 and about the intersection portion 72 and relative to the wall 16-1. With such rotation the first curved portion 70 and the second curved portion 86 act as a guide for the electronic apparatus assembly 15 to slide into a wall opening 130 and pivot 136 to a final mounting position relative to the first wall 16-1. For example, as the installer pivots 136 the electronic apparatus assembly 15 during an installation or a removal, the second curved portion 86 minimizes snagging or interference with a rear wall 16-2 and the curved portion 70 minimizes snagging or interference with the front wall 16-1. Additionally, the angled portion 88 is configured to allow an increase in the length of the housing 50 along the longitudinal axis 78 while preventing or minimizing a corner portion 138 of the housing 50 from physically touching the rear wall 16-2 of the structure, such as the back of the drywall in a stud bay, during installation or removal.

Next, with reference to FIG. 8, the installer advances the electronic apparatus assembly 15 into the opening 130 along the longitudinal axis 62 of the first housing portion 52, such as along direction 134. Because the first housing portion 52 has a height 66 that is smaller than the opening height and a width 64 that is smaller than the opening width 132, the installer can easily fit the first housing portion 52 within the opening 130. As indicated in FIG. 8, the installer advances the electronic apparatus assembly 15 toward the wall 16-1 until the flange member 75 abuts the wall 16-1. The installer can then secure the electronic apparatus assembly 15 to the wall 16-1 of the structure using a housing attachment mechanism 140 and cover the first front portion 58 of the electronic apparatus assembly 15 with a trim plate or cover plate 141.

Accordingly, as illustrated, the geometry or physical configuration of the housing 50 allows the electronic apparatus assembly 15 to contain a greater number or larger volume of electronic components for a particular application while minimizing interference with a support structure during installation or removal. Additionally with such a physical configuration of the housing 50, the electronic apparatus assembly 15 can be installed within a standard-sized wall opening for a conventional single ganged outlet box, thereby limiting the size of the cut-out for installation and minimizing disruption to the décor or style of the intended structure wall or room during installation.

As indicated above, installer uses a housing attachment mechanism 140 to couple the electronic apparatus assembly 15 to a wall structure 16. The housing attachment mechanism 140 can be configured in a variety of ways, as will be described below.

Figure 2:
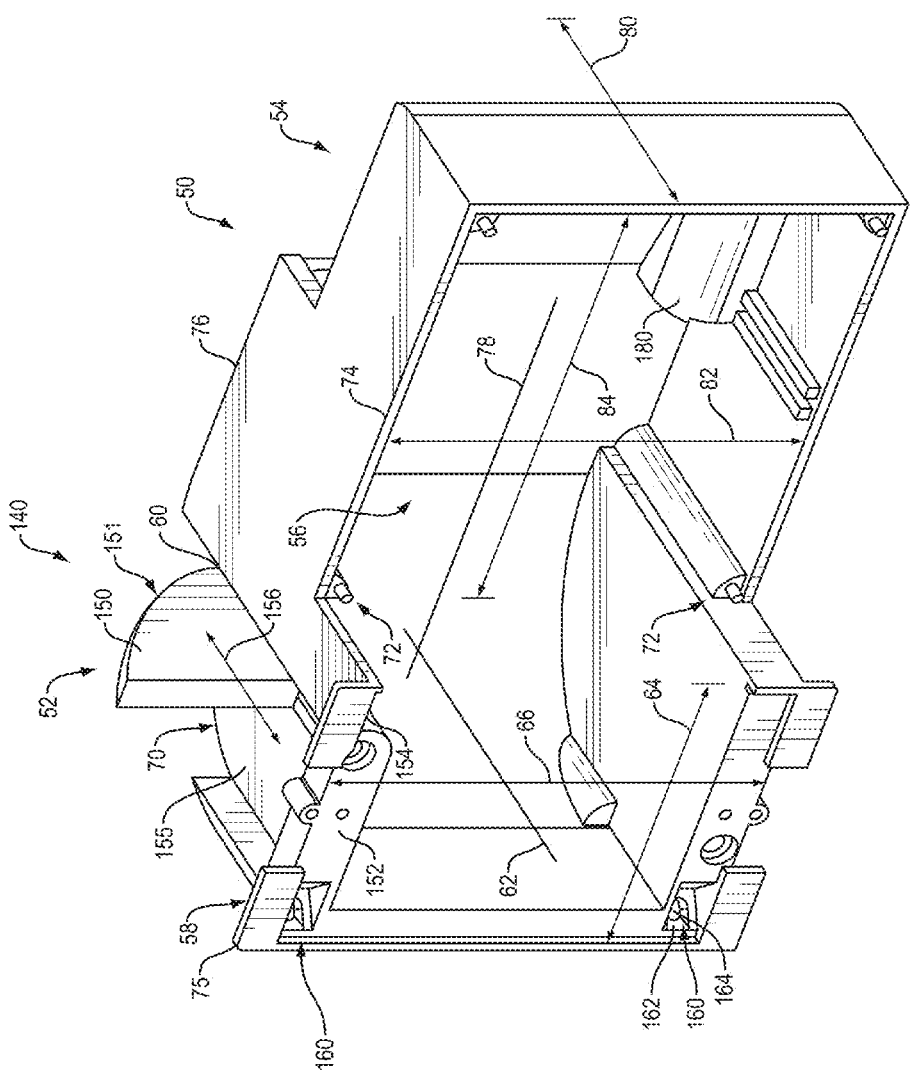
FIG. 2 illustrates a front perspective view of a housing of the electronic apparatus assembly of FIG. 1, according to one embodiment.
Figure 5:
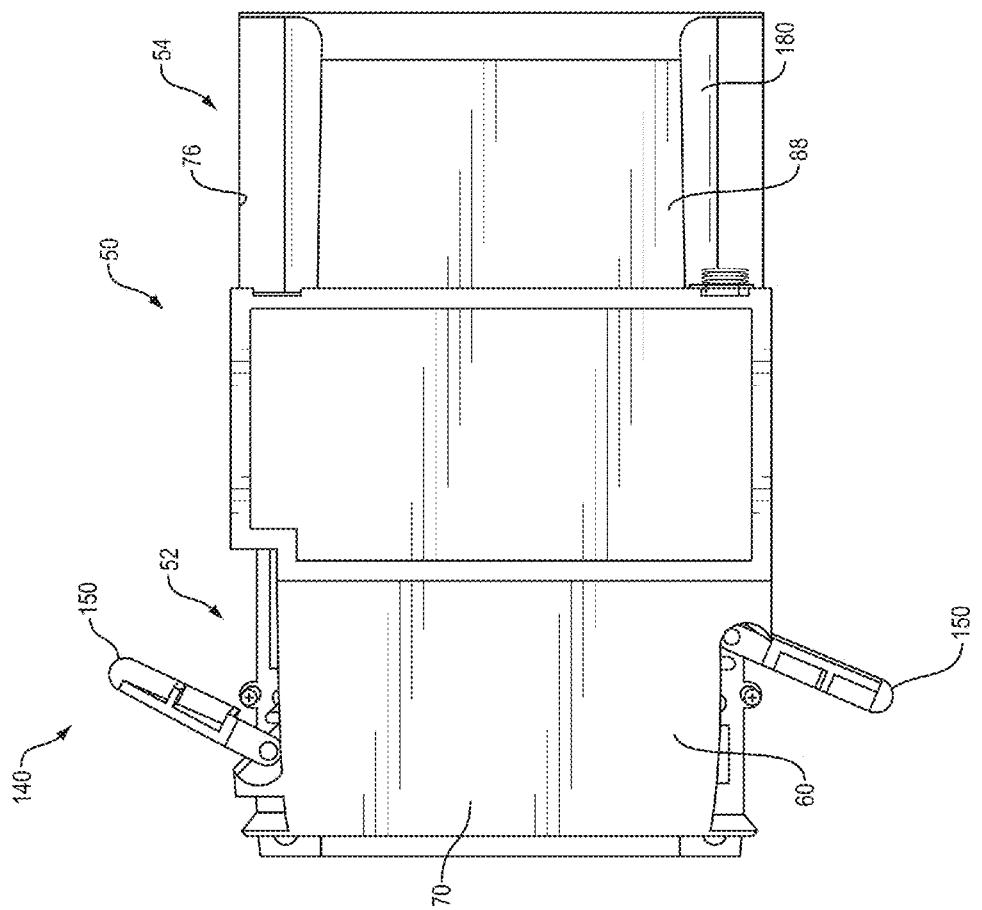
FIG. 5 illustrates a rear view of the housing of the electronic apparatus assembly of FIG. 2, according to one embodiment.

In one arrangement, with reference to FIGS. 2 and 5, the housing attachment mechanism 140 is configured as one or more clamps 150. The clamp 150 includes a curved rear surface 151 that mirrors or follows the first curved portion 70 of the first housing portion 52. With such a configuration of the curved rear surface 151, when the clamp 151 rests against an upper surface 155 of the housing 50, the clamp 150 will not interfere with installation or removal of the electronic apparatus assembly 15 from a support structure. The clamp 150 is also moveably secured to a front wall 152 of the first housing portion 52 that extends about a perimeter of the first housing portion 52 via a fastener, such as one or more screws or bolts (not shown). Rotation of the fastener within a fastener housing 154 causes the clamp to translate along direction 156. In use, as an installer rotates the fastener clockwise within the fastener housing, rotation of the fastener causes the clamp 150 to advance toward the flange portion 75. As the clamp 150 contacts a wall member disposed between the clamp and the flange portion 75, further rotation of the fastener causes the clamp 150 to continue to advance to compress the wall portion between the clamp 150 and the flange portion 75, thereby securing the electronic apparatus assembly 15 to the wall. With such securing, the clamp 150 distributes the clamping load along a centerline of the first housing portion 52. By distributing the clamping load along a centerline of the first housing portion 52, the clamp 150 increases the housing's 50 resistance to bending along a center axis of the housing 50 in response to the application of shear forces, such as are applied when an audio speaker 26 is mounted to the electronic apparatus assembly 15 via mechanical coupling mechanism 28.

Figure 3:
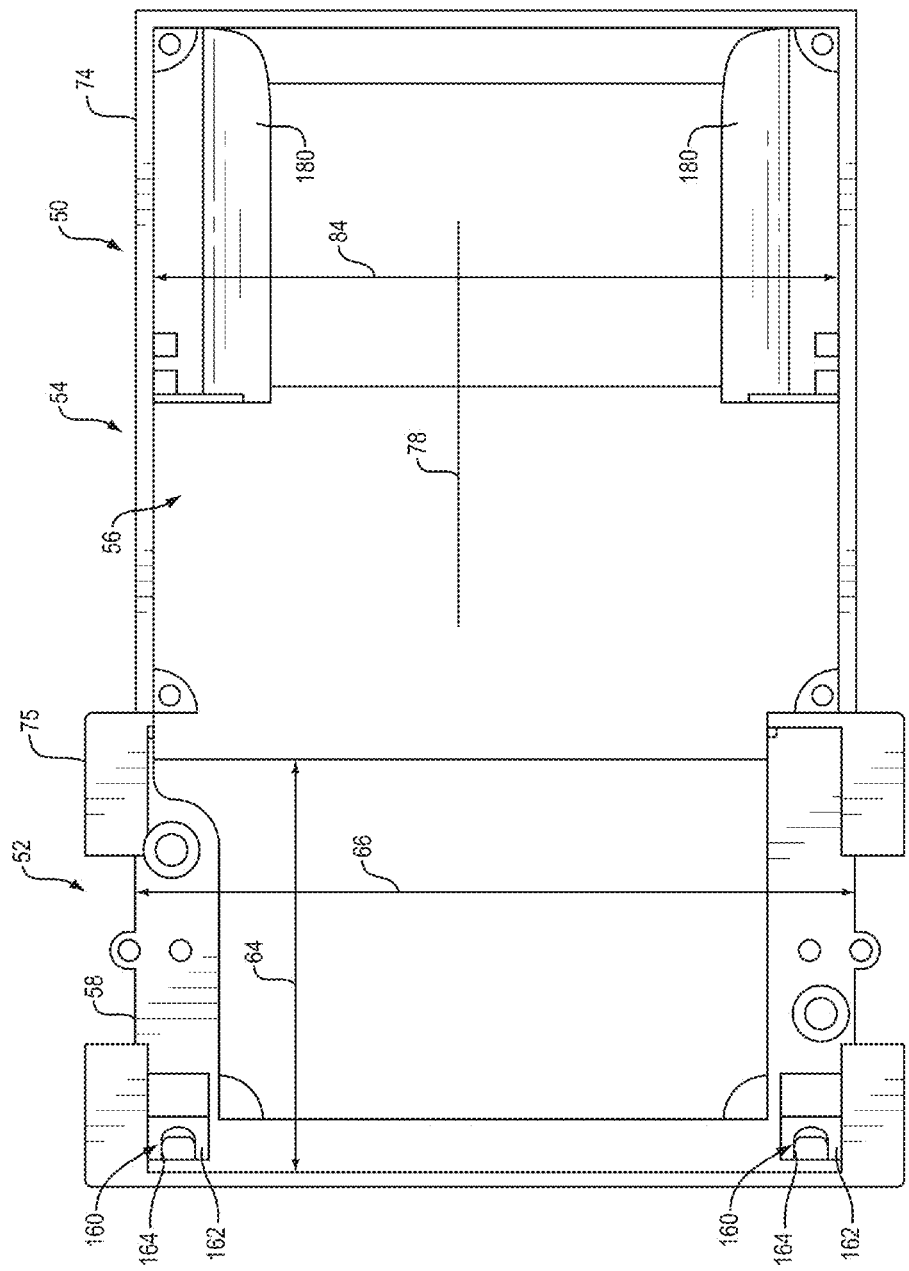
FIG. 3 illustrates a front view of the housing of the electronic apparatus assembly of FIG. 2, according to one embodiment.
Figure 4:
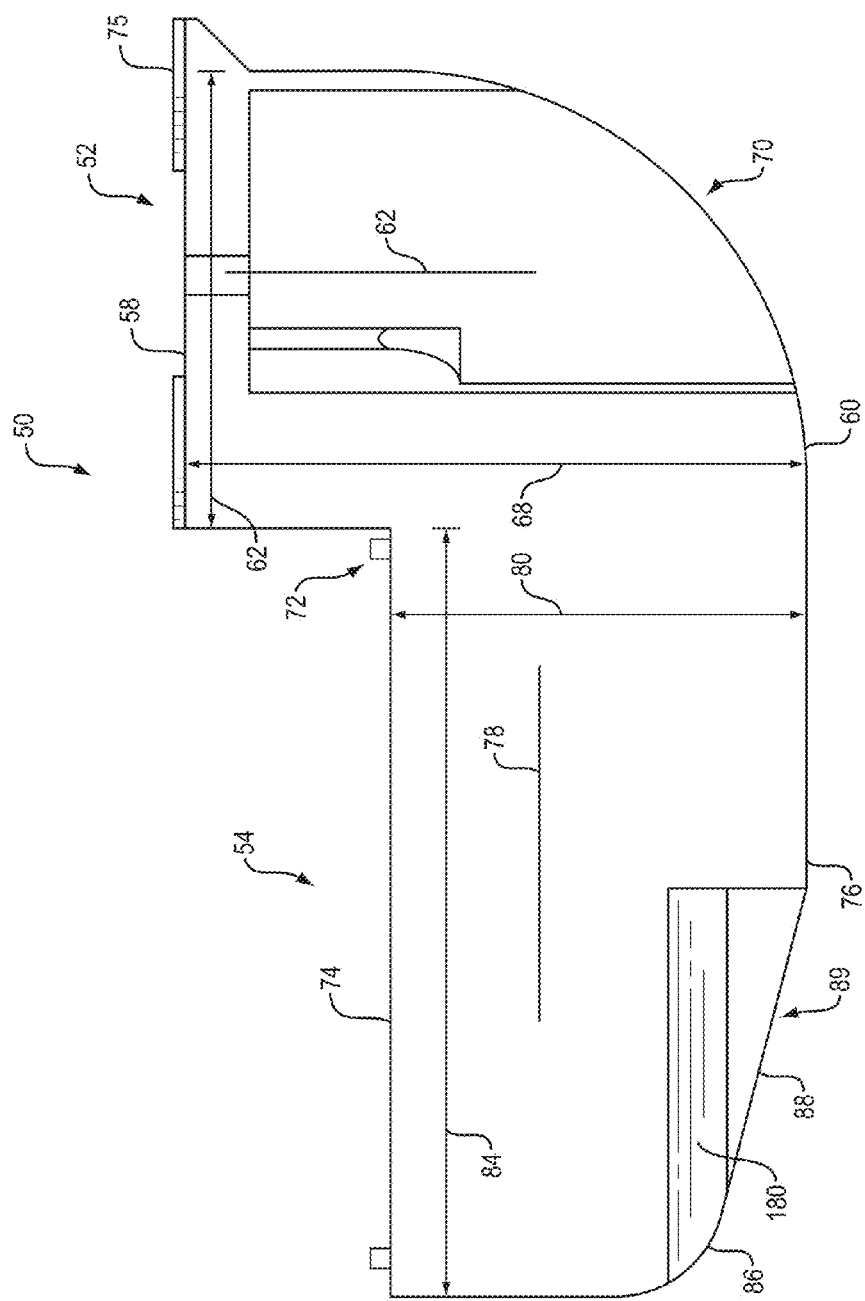
FIG. 4 illustrates a top view of the housing of the electronic apparatus assembly of FIG. 2, according to one embodiment.

In another arrangement, with reference to FIGS. 2 and 3, the housing attachment portion 140 defines one or more wedge-shaped channels 160 within the front wall 152 of the first housing portion 52. As illustrated a wall 162 of the wedge-shaped channel 160 defines an opening 164 configured to receive a fastener (not shown) to secure the housing 50 to a structure. For example, the opening 164 of the wedge-shaped channel 160 can align a fastener, such as a nail, toward a wall stud 170, such as illustrated in FIGS. 6-8 to provide accurate positioning of the fastener relative to the stud 170 and, therefore, appropriate coupling of the electronic apparatus assembly 15 to the wall.

In one arrangement, the housing 50 of the electronic apparatus assembly 15 is further configured enhance installation of the electronic apparatus assembly 15 to a support structure. For example, with reference to FIGS. 2-5, the second housing portion 54 defines one or more recessed channels 180 designed to accommodate the different wall thicknesses used in construction. In one arrangement, the recessed channels 180 in the housing 50 are utilized when a wire or cable is intended to enter or exit a chamber from the back of the electronic apparatus assembly 15. The recessed channel 180 acts as a guide to protect the wire or cable so the wire or cable does not restrict the electronic apparatus assembly 15 from sliding into an opening 130 of a structure or cause the housing 50 to pinch the wire against the support structure. For example, with reference to FIGS. 6-8, without the recessed channel 180, the electronic apparatus assembly 15 may not fit through the opening 130 as intended. By design, a wire 135 would impinge upon the rear wall 16-2 when an installer inserts the assembly within the cavity 131. Accordingly, the recessed channel 180 maintains the wire or cable 135 as substantially flush with the second rear portion 76 of the second housing portion 54, thereby allowing the electronic apparatus assembly 15 to be installed within a relatively small (i.e. standard) wall cavity 131 and cutout opening 130.

As indicated above, the first housing portion 52 and the second housing portion 54 define a single chamber 56 having a volume configured to contain electronic components, such as a wireless transceiver 18 and a signal amplifier circuit 24. In certain cases, it may be desired to separate the components within the chamber 56 because of physical size restrictions or operational restrictions of the components. Accordingly, in one arrangement, the first and second housing portions 52, 54 define multiple chambers configured to contain distinct electronic components.

Figure 9:
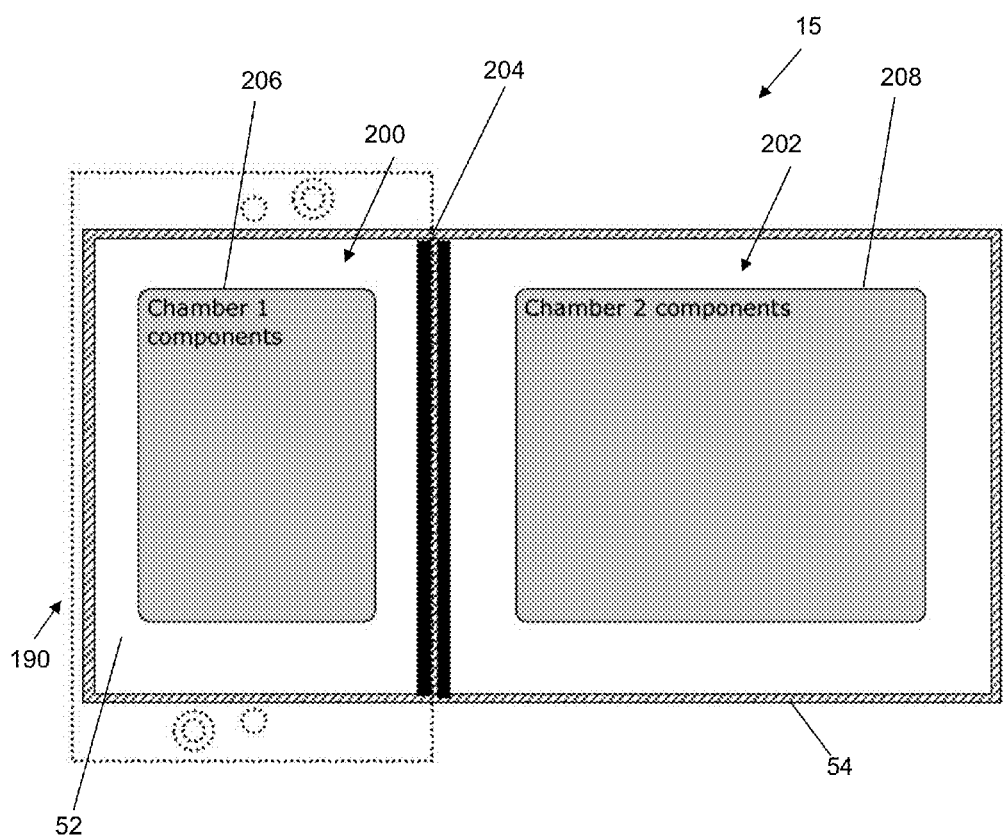
FIG. 9 illustrates an electronic apparatus assembly having two chambers, according to one embodiment.

FIG. 9 illustrates an arrangement of an electronic apparatus assembly 15 that defines a first chamber 200 and a second chamber 202. In one arrangement, the housing 190 includes a wall or physical barrier 204 disposed between the first housing portion 52 and the second housing portion 54 to define a first chamber 200 associated with the first housing portion 52 and a second chamber 202 associated with the second housing portion 54. In one arrangement, the first and second chambers 200, 202 are configured to carry relatively low-voltage electronic components 206, 208, respectively. For example, the first chamber 200 can contain a signal amplifier circuit 24 while the second chamber 202 can contain a wireless transceiver 18. Alternately, the first and second chambers 200, 202 can be configured to carry electronic keypads and associated components, electronic audio speakers and associated components, electronic wireless audio parts and associated components, electronic wireless video parts and associated components, and electronic wireless network parts and associated components. Separation of the first and second housing portions 52, 54 into separate chambers 200, 202, by a physical barrier 204 made of materials accepted by industry standards can improve the performance of the components 206, 208 during operation, such as by minimizing electrical interference between the components 206, 208.

Figure 10:
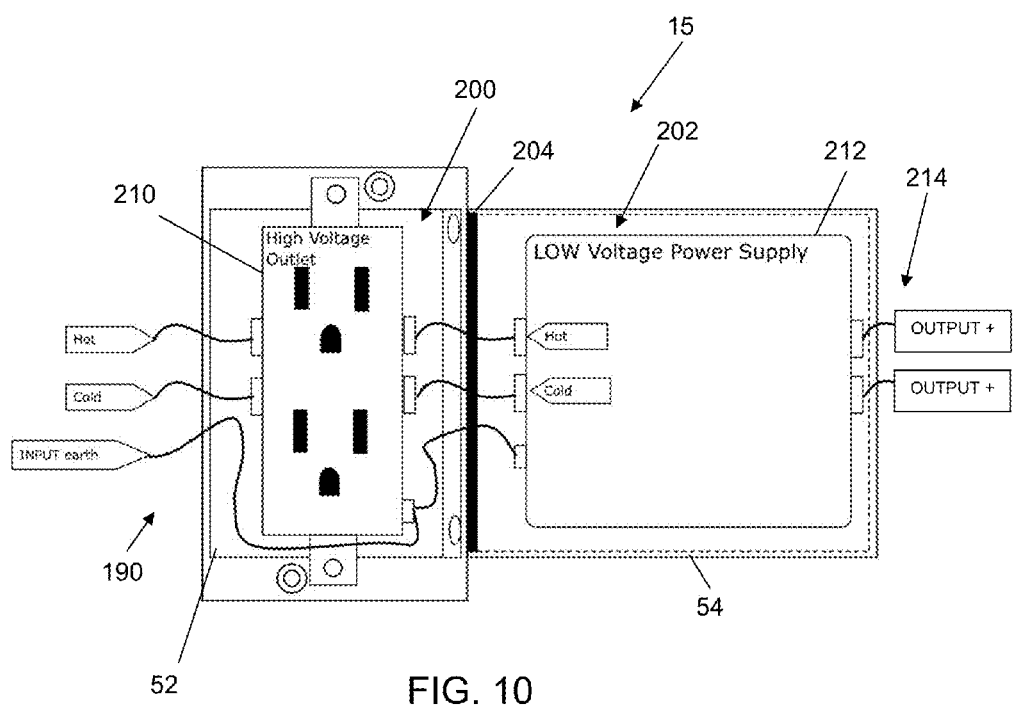
FIG. 10 illustrates a front view of the electronic apparatus assembly of FIG. 9 having a high voltage component and a low voltage component, according to one embodiment.

In one arrangement, the housing 190 of the electronic apparatus assembly 15 defines first and second chambers 200, 202 that serve as compartmentalized housing for both low voltage components and high voltage components. With reference to FIG. 10, the first chamber 200 of the housing 190 is configured to carry a first element 210 of an electronic apparatus where the first element has a first operational voltage. For example, the first chamber 200 contains a high voltage outlet. The second chamber 202 is configured to carry a second element 212 of the electronic apparatus where the second element has a second operational voltage, the second operational voltage being greater than the first operational voltage. For example, the second chamber 202 contains a low voltage power supply 212 where the operating voltage of the low voltage power supply is less than the operational voltage of the high voltage outlet. The low voltage power supply 212 receives power from a high voltage house line 214 and outputs a low voltage current, as determined by the application.

Conventional industry standards do not allow a high voltage device 210 to be contained next to a low voltage device 212 in an enclosure 190 without a physical barrier 204 being disposed there between for safety purposes. In one arrangement, the wall 204 includes an electronic shielding material disposed between the first chamber 200 and the second chamber 202 to electrically shield the electrical components, such as components 210 and 212 from transmitting or receiving undesired electrical interference. For example, the shielding between the first and second chambers 200, 202 can be made from a variety of materials, such as aluminum, copper, MYLAR, gold, silver (e.g., either in a solid sheet form or a braided structure), for example. These types of shielding are important to protect the electronic components 210, 212 carried by the first and second housing portions 52, 54 from interference from internal or external sources. For example, in the case where the second housing portion 54 contains radio frequency components, the function of the radio frequency wave can be undermined by electrical interference from power sources such as electrical outlets, wires, or power supplies carried by the first housing portion 52. The radio frequency component function may also be compromised by other radio frequency devices. Therefore, a shielding mechanism, such as the shielded wall 204 is important to minimize the interference and maximize the function of the radio frequency device.

Figure 11:
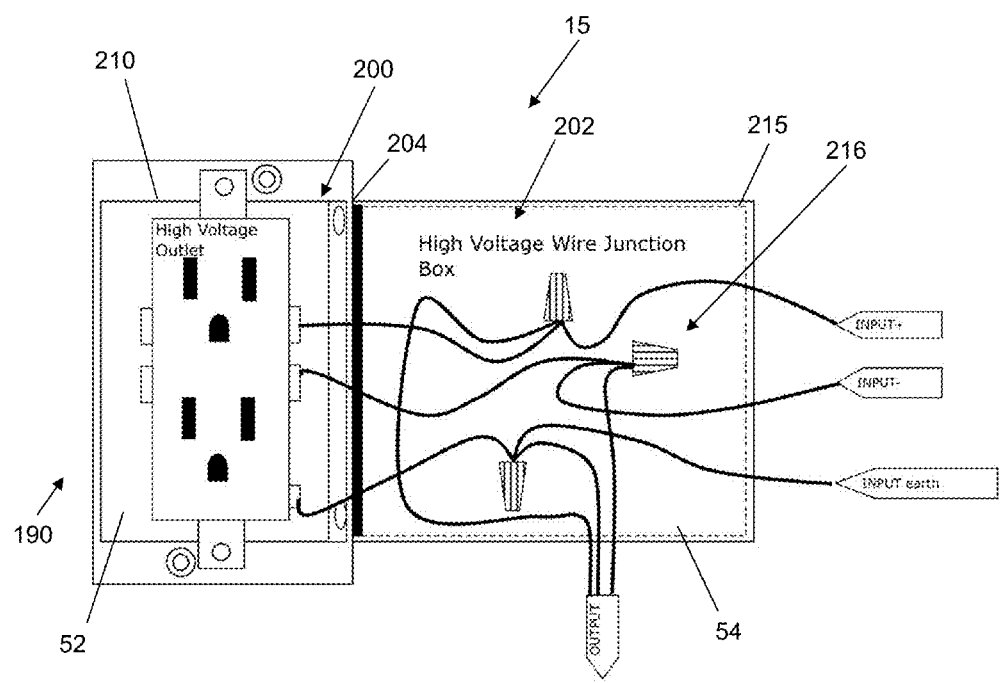
FIG. 11 illustrates a front view of the electronic apparatus assembly of FIG. 9 having a high voltage component and a low voltage component, according to one embodiment.
Figure 12:
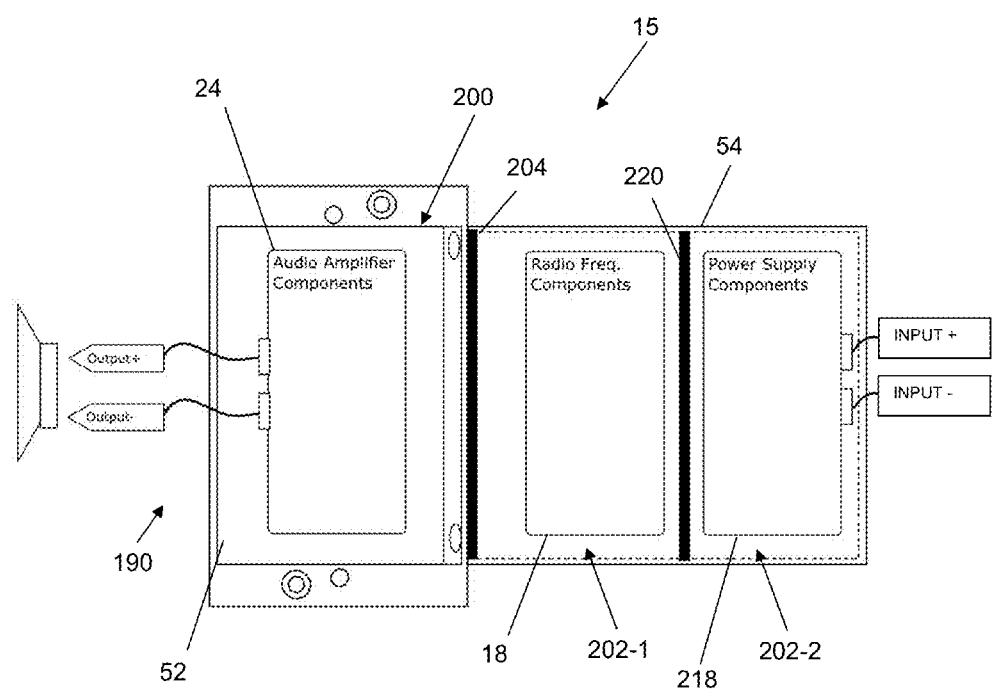
FIG. 12 illustrates a front view of the electronic apparatus assembly of FIG. 9 having a high voltage component and a low voltage components, according to one embodiment.
Figure 13:
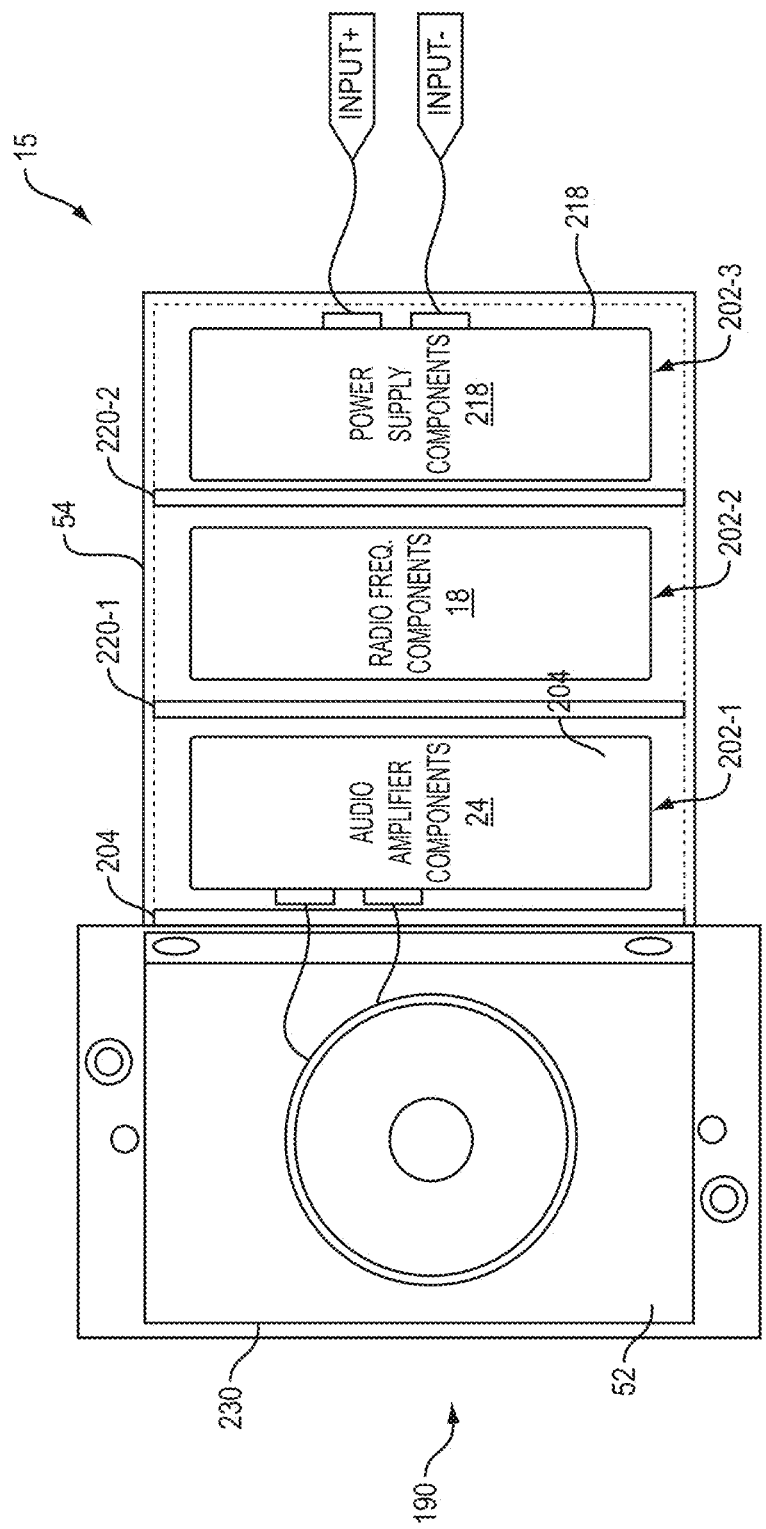
FIG. 13 illustrates an alternate embodiment of the electronic apparatus assembly of FIG. 12.

FIGS. 11-13 illustrate alternate embodiments of the housing 190 and electronic apparatus assembly 15 illustrated in FIG. 9.

As illustrated in FIG. 11, the electronic apparatus assembly 15 includes a first chamber 52 that houses a high voltage device 210, such as a high voltage, and a second chamber 54 that also houses a high voltage device 215, such as a wire junction box. The high voltage device includes multiple wires 216 that normally cannot fit in a standard single gang outlet box. Accordingly, the geometry of the housing 190, as described above, allows the wires 216 to be contained within the housing 190 while minimizing disruption to the décor or style of the intended structure wall or room during installation.

In FIG. 11, electronic apparatus assembly 15 includes a first housing portion 52 that houses a relatively low voltage amplifier circuit 24. The electronic apparatus assembly 15 also includes a second housing portion subdivided by a wall 220, such as a shielded wall, into a first sub-chamber 202-1, and a second sub-chamber 202-2. The first sub-chamber 202-1 contains a relatively low voltage wireless transceiver 18 while the second sub-chamber 202-2 includes a relatively high voltage power supply 218. With such a configuration, the electronic apparatus assembly 15 receives standard high voltage power in the second sub-chamber 202-2 and converts the high voltage power to a voltage necessary for use by components of chambers 202-1, 200.

In FIG. 13, the electronic apparatus assembly 15 includes a first housing portion 52 that houses an audio speaker 230. The electronic apparatus assembly 15 also includes a second housing portion subdivided by first and second walls 220-1, 220-1, such as shielded walls, into a first sub-chamber 202-1, a second sub-chamber 202-2, and a third sub-chamber 202-3. The first sub-chamber 202-1 contains a relatively low voltage amplifier circuit 24, the second sub-chamber 202-2 contains a relatively low voltage wireless transceiver 18, and the third sub-chamber 202-3 includes a relatively high voltage power supply 218.

With respect to FIGS. 9-13, some embodiments of the electronic apparatus assembly 15 provide for modular removable of the chambers. Taking FIG. 12 as an example, in the case where the housing 190 is configured as a modular assembly, chamber 202-2 can be removed from, or attached, to chamber 202-1. While such modularity can be accomplished in a variety of ways, in one arrangement, the electronic apparatus assembly 15 can include mechanical, physical, or electronic elements to allow separation and attachment of each chamber in a temporary or permanent fashion. Also with respect to FIGS. 9-13, the housing 190 can be manufactured from a variety of materials. In one arrangement, the housing 190 is manufactured from several different materials. For example, taking FIG. 12 as an example, the housing 190 can be manufactured such that the first housing portion 54 is manufactured from a plastic material and the second housing portion 54 is manufactured from a metal material.

Figure 14:
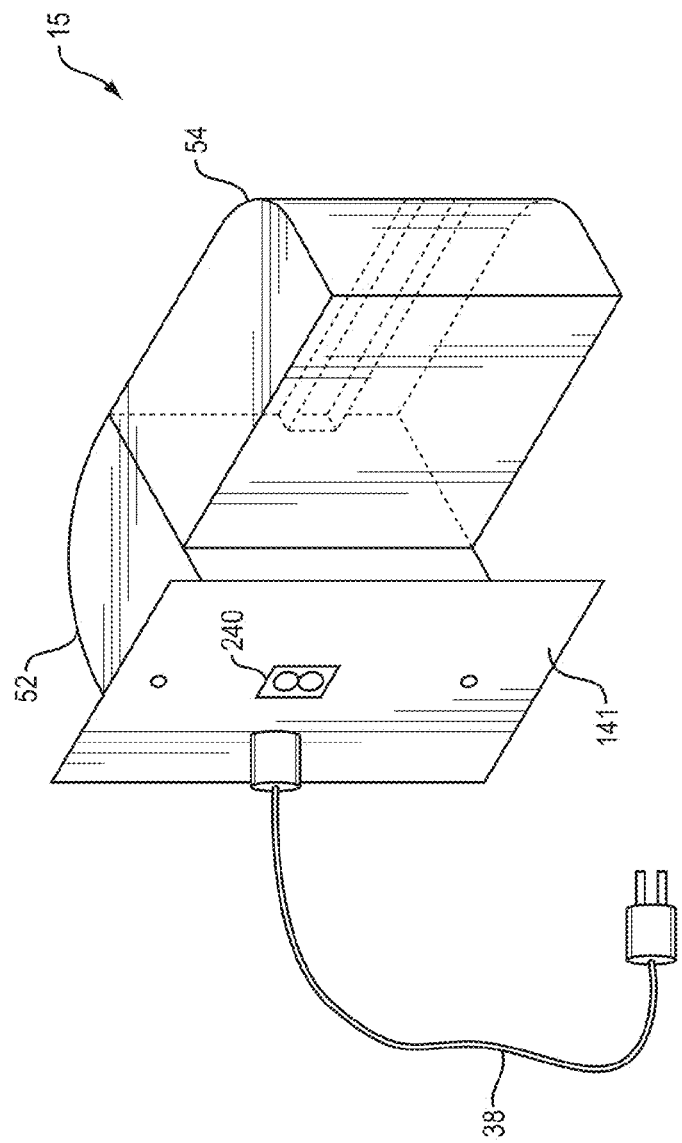
FIG. 14 illustrates a perspective view of an electronic apparatus assembly having a face plate portion and a power adapter component attached to the face plate portion of the electronic apparatus assembly.
Figure 15:
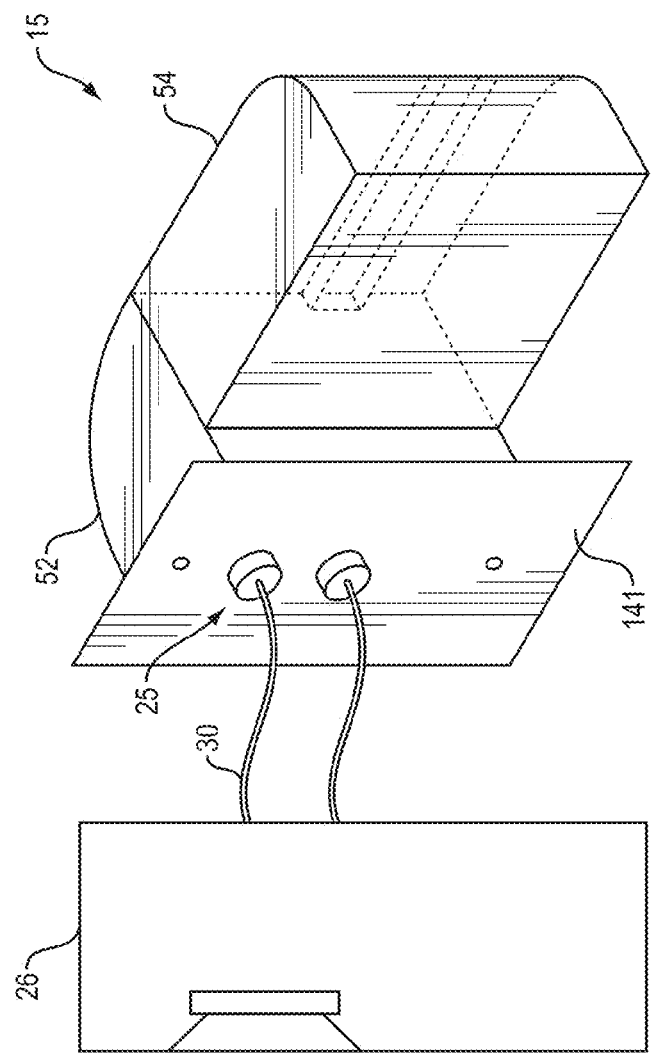
FIG. 15 illustrates a perspective view of an electronic apparatus assembly having a face plate portion and an audio speaker adapter component attached to the face plate portion of the electronic apparatus assembly.
Figure 16:
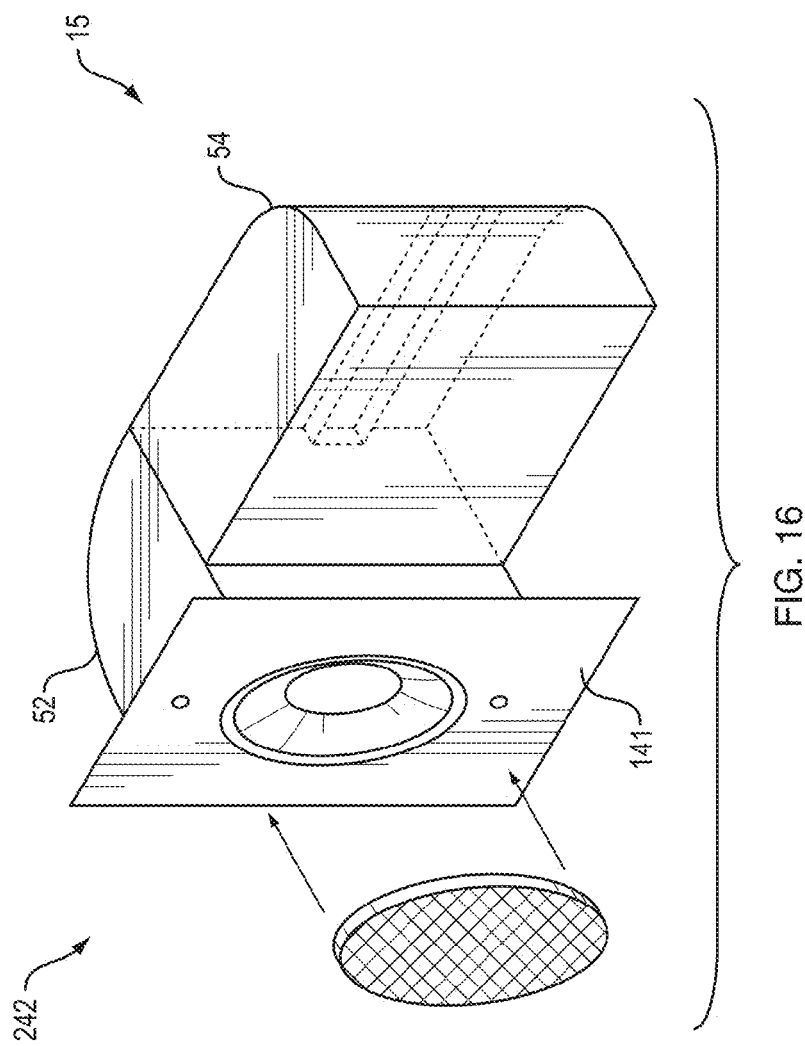
FIG. 16 illustrates a perspective view of an electronic apparatus assembly having a face plate portion and an audio speaker attached to the face plate portion of the electronic apparatus assembly.
Figure 17:
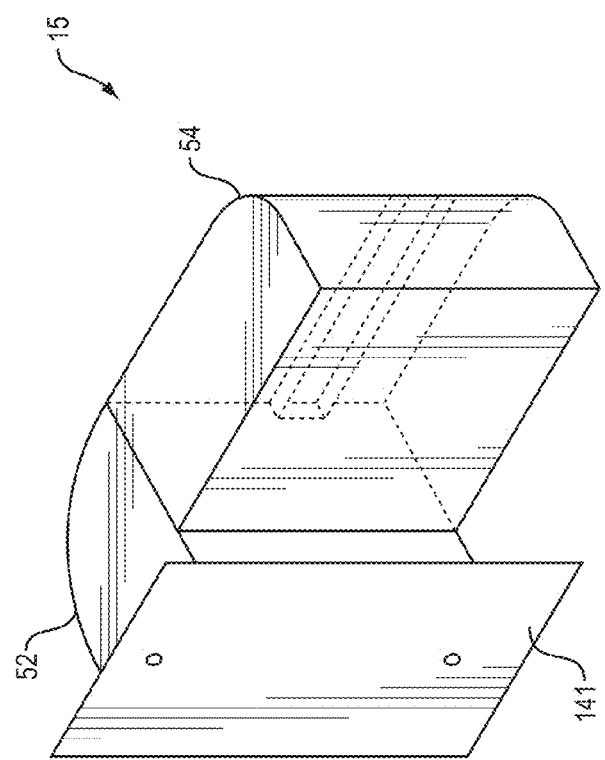
FIG. 17 illustrates a perspective view of an electronic apparatus assembly having a blank face plate portion attached to housing of the electronic apparatus assembly.

In one arrangement, the electronic apparatus assembly 15 is configured to be installed in an existing finished wall 16 with little effort and to be covered by a trim plate or cover plate 141. For example, the electronic apparatus assembly 15 can be installed prior to the finishing of the walls 16 and covered by cover plate 141 or by the finish wall material The cover plate 141 can be configured in a variety of ways, as illustrated in FIGS. 14-17. For example, as illustrated in FIG. 14, the cover plate 141 includes a power adaptor access portion 240 to allow a power adapter component 38 to be attached to the electronic apparatus assembly 15. As illustrated in FIG. 15, the cover plate 141 includes audio speaker access portions 25 to allow an external audio speaker 26 to be electrically coupled to the electronic apparatus assembly 15 via speaker wires 30. As illustrated in FIG. 16, the cover plate 141 includes a loudspeaker 242 configured to be inserted within the first housing portion 52. As illustrated in FIG. 17, the cover plate 141 is configured to cover the first housing portion 52 without providing wired electrical access to the electrical components contained by the first housing portion 52.

While various embodiments of the invention have been particularly shown and described, it will be understood by those skilled in the art that various changes in form and details may be made therein without departing from the spirit and scope of the invention as defined by the appended claims.

For example, as illustrated in FIG. 10, the electronic apparatus assembly 15 includes the high voltage component 210 in the first chamber 200 and the low voltage component 212 in the second chamber 202. Such illustration is by way of example only. In one arrangement, the electronic apparatus assembly 15 can include the low voltage component 212 in the first chamber 200 and the high voltage component 210 in the second chamber 202.

For example, as illustrated in FIG. 14, the cover plate 141 includes a power adaptor access portion 240 to allow a power adapter component 38 to be attached to the electronic apparatus assembly 15. Such illustration is by way of example only. In one arrangement, the electronic apparatus assembly 15 receives power via a battery contained by the housing.

It is also understood that the electronic apparatus assembly 15 is not limited in use to a retrofit application whereas the electronic apparatus assembly 15 is placed into an installed within an existing wall or structure. In one arrangement, the electronic apparatus assembly 15 is installed during the normal construction phase of a structure. Additionally, the electronic apparatus assembly 15 is designed to allow for easy extraction from wall structure 16 when used in this manner.

As described above with reference to FIGS. 10-13, the chamber wall 220 is configured with an electronic shielding material to minimize electronic disruption of the components carried by the respective chambers. Such description is by way of example only. In one arrangement, each of the chambers (i.e., the walls of the housing that define the chambers along with wall 220) includes a shielding material disposed therein to provide a shielding cage about each electronic component.

What is claimed is:

1. A housing for an electronic apparatus, comprising:
a first housing portion having a first front portion, a first rear portion opposing the first front portion, and a first longitudinal axis extending between the first front portion and the first rear portion, the first front portion defining first width;
a second housing portion having a second front portion and a second rear portion opposing the second front portion, the second front portion and the second rear portion extending from the first housing portion along a second longitudinal axis, the second longitudinal axis being substantially perpendicular to the first longitudinal axis, a distance between the second front portion and the second rear portion defining a second width, the second width being substantially equal to the first width; and
the first housing portion and the second housing portion defining a chamber configured to contain the electronic apparatus;
wherein the first housing portion comprises a housing attachment mechanism, the housing attachment mechanism configured to secure the housing to a wall element;
the first front portion comprises a front wall extending about a perimeter of the first housing portion; and
the housing attachment mechanism comprises a clamp moveably coupled to the front wall of the first front portion of the first housing portion, the clamp configured to move between a first position and a second position to secure the housing to a structure.

2. The housing of claim 1, wherein the first housing portion defines a first curved portion extending between the first front portion and the first rear portion.

3. The housing of claim 1, wherein the second housing portion defines a second curved portion extending between the second front portion and the second rear portion.

4. The housing of claim 3, wherein the second curved portion comprises an angled portion extending between the second curved portion and the second rear portion.

5. The housing of claim 1, wherein the first housing portion and the second housing portion define a single chamber having a volume configured to contain the electronic apparatus.

6. The housing of claim 1, comprising a wall disposed between the first housing portion and the second housing portion to define a first chamber associated with the first housing portion and a second chamber associated with the second housing portion, the first chamber configured to carry a first element of the electronic apparatus and the second chamber configured to carry a second element of the electronic apparatus.

7. The housing of claim 6, wherein the wall comprises an electronic shielding material disposed between the first chamber and the second chamber, the first chamber configured to carry the first element of the electronic apparatus having a first operational voltage and the second chamber configured to carry the second element of the electronic apparatus having a second operational voltage, the second operational voltage being less than the first operational voltage.

8. The housing of claim 1, comprising a cover plate coupled to the first front portion of the first housing portion.

9. The housing of claim 8, wherein the cover plate comprises an audio speaker access portion configured to provide electrical communication between an audio speaker and the electronic apparatus.

10. The housing of claim 9, wherein the cover plate further comprises a power adaptor access portion configured to provide electrical communication between a power adaptor component and the electronic apparatus.

11. The housing of claim 1, wherein the second housing portion defines a recessed channel extending along the longitudinal axis of the second housing portion, the recessed channel configured to carry at least a portion of at least one wire from a location external to the housing through the second housing portion.

12. An electronic apparatus assembly, comprising:
a housing having:
a first housing portion having a first front portion, a first rear portion opposing the first front portion, and a first longitudinal axis extending between the first front portion and the first rear portion, the first front portion defining first width,
a second housing portion having a second front portion and a second rear portion opposing the second front portion, the second front portion and the second rear portion extending from the first housing portion along a second longitudinal axis, the second longitudinal axis being substantially perpendicular to the first longitudinal axis, a distance between the second front portion and the second rear portion defining a second width, the second width being substantially equal to the first width, and
the first housing portion and the second housing portion defining a chamber; and
an electronic apparatus disposed within the chamber;
wherein the first housing portion comprises a housing attachment mechanism, the housing attachment mechanism configured to secure the housing to a wall element;
the first front portion comprises a front wall extending about a perimeter of the first housing portion; and
the housing attachment mechanism comprises a clamp moveably coupled to the front wall of the first front portion of the first housing portion, the clamp configured to move between a first position and a second position to secure the housing to a structure.

13. The electronic apparatus assembly of claim 12, wherein the first housing portion defines a first curved portion extending between the first front portion and the first rear portion.

14. The electronic apparatus assembly of claim 12, wherein the second housing portion defines a second curved portion extending between the second front portion and the second rear portion.

15. The electronic apparatus assembly of claim 14, wherein the second curved portion comprises an angled portion extending between the second curved portion and the second rear portion.

16. The electronic apparatus assembly of claim 12, comprising a wall disposed between the first housing portion and the second housing portion to define a first chamber associated with the first housing portion and a second chamber associated with the second housing portion, the first chamber configured to carry a first element of the electronic apparatus and the second chamber configured to carry a second element of the electronic apparatus.

17. The electronic apparatus assembly of claim 16, wherein the wall comprises an electronic shielding material disposed between the first chamber and the second chamber, the first chamber configured to carry the first element of the electronic apparatus having a first operational voltage and the second chamber configured to carry the second element of the electronic apparatus having a second operational voltage, the second operational voltage being less than the first operational voltage.

18. The electronic apparatus assembly of claim 12, wherein the electronic apparatus comprises:
a wireless transceiver;
a signal amplifier circuit disposed in electrical communication with the wireless transceiver; and
an electrical connector disposed in electrical communication with the signal amplifier circuit, the electrical connector configured to be coupled to a loudspeaker.

19. A housing for an electronic apparatus, comprising:
a first housing portion having a first front portion, a first rear portion opposing the first front portion, and a first longitudinal axis extending between the first front portion and the first rear portion, the first front portion defining first width;
a second housing portion having a second front portion and a second rear portion opposing the second front portion, the second front portion and the second rear portion extending from the first housing portion along a second longitudinal axis, the second longitudinal axis being substantially perpendicular to the first longitudinal axis, a distance between the second front portion and the second rear portion defining a second width, the second width being substantially equal to the first width; and
the first housing portion and the second housing portion defining a chamber configured to contain the electronic apparatus;
wherein the first housing portion comprises a housing attachment mechanism, the housing attachment mechanism configured to secure the housing to a wall element;
the first front portion comprises a front wall extending about a perimeter of the first housing portion; and
the housing attachment mechanism defines a wedge-shaped channel within the front wall, a wall of the wedge-shaped channel defining an opening configured to receive a fastener to secure the housing to a structure.

\* \* \* \* \*